(12) United States Patent
Addair et al.

(10) Patent No.: US 8,464,300 B2
(45) Date of Patent: Jun. 11, 2013

(54) SYSTEMS AND METHODS FOR RECEIVING DEVICE HEALTH MANAGEMENT

(75) Inventors: Jonathan E. Addair, Littleton, CO (US); Erik C. Johnson, Littleton, CO (US); Shawn Sullivan, Lakewood, CO (US)

(73) Assignee: Dish Network L.L.C., Englewood, CO (US)

( * ) Notice: Subject to any disclaimer, the term of this patent is extended or adjusted under 35 U.S.C. 154(b) by 935 days.

(21) Appl. No.: 12/211,771

(22) Filed: Sep. 16, 2008

(65) Prior Publication Data

US 2010/0071011 A1 Mar. 18, 2010

(51) Int. Cl.
*H04N 7/173* (2011.01)

(52) U.S. Cl.
USPC .......................................... 725/107; 379/1.01

(58) Field of Classification Search
USPC .......................................................... 725/107
See application file for complete search history.

(56) References Cited

U.S. PATENT DOCUMENTS

| | | | | |
|---|---|---|---|---|
| 5,884,284 A * | 3/1999 | Peters et al. | ..................... | 705/30 |
| 2005/0183130 A1* | 8/2005 | Sadja et al. | ..................... | 725/107 |
| 2006/0112434 A1* | 5/2006 | Banker et al. | ................... | 726/27 |
| 2009/0070621 A1* | 3/2009 | Yanagi | ............................... | 714/3 |

OTHER PUBLICATIONS

SatelliteGuys.US, "Call from Dish (or someone) regarding 015 error—SatelliteGuys.US," http://www.satelliteguys.us/dish-network-forum/117913-call-dish-someone-regarding-015-error.html, download date of Aug. 18, 2008, 17 pages.
SatelliteGuys.US, "Dish courtesy call—SatelliteGuys.US" http://www.satelliteguys.us/dish-network-forum/118395-dish-courtesy-call.html, download date of Aug. 12, 2008, 26 pages.

* cited by examiner

*Primary Examiner* — Nicholas Corbo
(74) *Attorney, Agent, or Firm* — Seed IP Law Group PLLC (57) ABSTRACT

Various embodiments facilitate the management of receiving device health. One embodiment provides a receiving device health manager that identifies receiving devices having degraded operational states, based on operational state data received from those receiving devices. The receiving device health manager may further determine and initiate corrective actions with respect to the identified receiving devices, based on information about customers associated with the receiving devices and/or about the receiving devices themselves. In one embodiment, a corrective action may include a customer service contact to schedule a receiving device repair visit by a technician. This abstract is provided to comply with rules requiring an abstract, and it is submitted with the intention that it will not be used to interpret or limit the scope or meaning of the claims.

25 Claims, 6 Drawing Sheets

| Customer ID | Receiving Device ID | Customer Since | Contract Expiration | Customer Type | Do Not Call | ZipCode | Customer Rating | ... |
|---|---|---|---|---|---|---|---|---|
| 411 | 311 | 15-July-2008 | 15-July-2009 | Commercial | no | 98108 | 4 | |
| 412 | 312 | 10-Jan-2004 | 10-Jan-2009 | Residential | yes | 45230 | 5 | |
| 413 | 313 | 01-Sept-2006 | 01-Sept-2008 | Residential | no | 60137 | 2 | |
| ... | | | | | | | | |

SYSTEMS AND METHODS FOR RECEIVING DEVICE HEALTH MANAGEMENT

TECHNICAL FIELD

The technical field relates to the management of the health of devices operable to receive and present audio/video/data content and more particularly, to apparatus, systems and methods for the detection and correction of degraded operational states of receiving devices, based on information about the receiving devices and/or associated customers.

BRIEF SUMMARY

In one embodiment, a computing system for receiving device health management is provided. The computing system includes a memory and a code module that is stored in the memory. The code module is configured, when executed, to: receive operational state data from each of a plurality of set-top boxes, wherein each of the plurality of set-top boxes has a corresponding customer and is configured to receive digital video programming from a satellite network; select a customer from the plurality of customers, based at least in part on the received operational health data from the set-top box that corresponds to the customer reflecting a degraded operational state of the set-top box; and initiate a customer service contact request with the customer.

In another embodiment, a method for receiving device health management is provided. The method includes: receiving operational state data from each of a plurality of receiving devices, wherein each of the plurality of receiving devices has a corresponding customer and is configured to receive digital video programming; identifying a customer from the plurality of customers, based at least in part on the received operational state data from the receiving device that corresponds to the customer reflecting a degraded operational state of the receiving device; and initiating an action with respect to the customer to correct the degraded operational state of the receiving device that corresponds to the customer.

In another embodiment, a computer-readable medium is provided, the computer-readable medium including contents that enable a computing system to facilitate receiving device health management, by performing a method that includes: determining, based on operational state data received from a remote receiving device that is configured to receive digital video programming, that the receiving device has a degraded operational state; and initiating an action to correct the degraded operational state of the receiving device.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
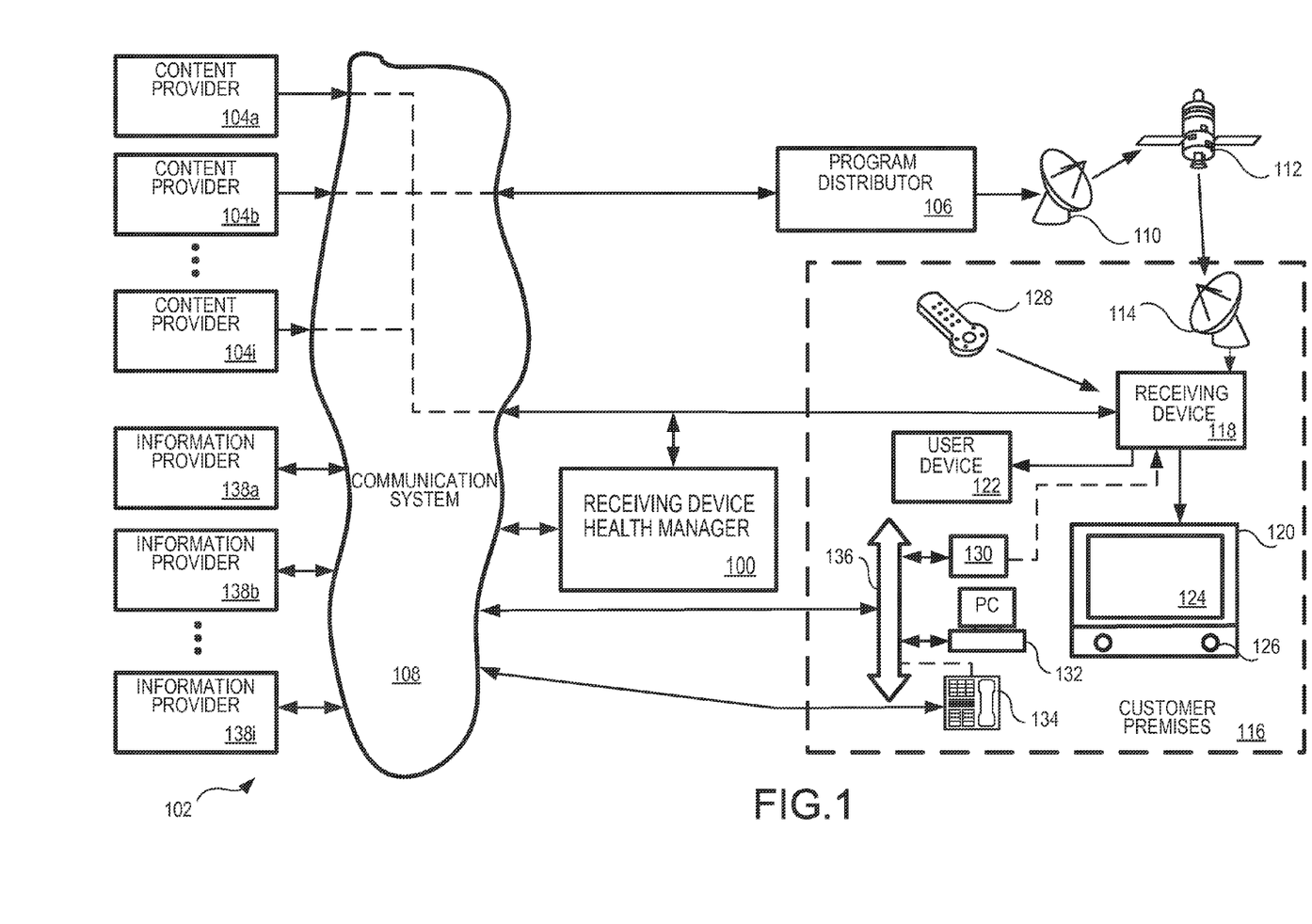
FIG. 1 is a block diagram illustrating an example communication system in which embodiments of a receiving device health manager may be implemented.

FIG. 1 is an overview block diagram illustrating an example communication system 102 in which embodiments of a receiving device health manager 100 may be implemented. It is to be appreciated that FIG. 1 illustrates just one example of a communications system 102 and that the various embodiments discussed herein are not limited to such systems. Communication system 102 can include a variety of communication systems and can use a variety of communication media including, but not limited to, satellite wireless media.

Audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television content or audio content, to a distributor, such as the program distributor 106. Example content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes. In some embodiments, the receiver antenna 114 may remotely located from the customer premises 116. For example, the antenna 114 may be located on the roof of an apartment building, such that the received signals may be transmitted, after possible recoding, via cable or other mechanisms, such as Wi-Fi, to the customer premises 116.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote device 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

Embodiments of the Receiving Device Health Manager ("RDHM") 100 are operable to manage the health of a plurality of receiving devices, such as receiving device 118. Managing the health of receiving device 118 may include initiating one or more corrective actions based on information such as information about the operational state of the receiving device 118, information about a customer associated with receiving device 118, as well as possibly a variety of other factors. In some embodiments, the RDHM 100 is operable to receive operational state data from the receiving device 118; determine, based on the received operational state data, that the receiving device 118 has a degraded operational state; and initiate an action to correct the degraded operational state.

In at least one embodiment, a degraded operational state may include a programming signal received by the receiving device 118 that is below a predetermined threshold level. The receiving device 118 may receive a low quality programming signal for various reasons, including: the receiver antenna 114 not being positioned properly because of wind or other factors that may cause the receiver antenna 114 to no longer point at the satellite 112; debris in the receiver antenna 114; signal attenuation due to precipitation or foliage; a poor communicative coupling between the receiver antenna 114 and the receiving device 118 caused by a loose connection and/or a degraded conductor; and the like.

When the receiving device 118 provides operational state data to the RDHM 100 that reflects a low quality programming signal, initiating a corrective action may include initiating a customer service contact request. Such a request may then be forwarded to a customer service agent that engages in a telephonic communication with a customer associated with the receiving device 118, in order to schedule a technician visit to the customer's premises. The technician may then correct the operational state of the receiving device 118 by, for example, adjusting the receiver antenna 114 and/or performing other actions to improve the operating conditions of the receiving device 118.

The above description of the communication system 102 and the customer premises 116, and the various devices therein, is intended as a broad, non-limiting overview of an example environment in which various embodiments of a receiving device health manager may be implemented. The communication system 102 and the various devices therein, may contain other devices, systems and/or media not specifically described herein.

Example embodiments described herein provide applications, tools, data structures and other support to implement a receiving device health manager to be used for managing the health of devices operable to receive and present video programming and/or other types of content. Other embodiments of the described techniques may be used for other purposes, including for monitoring and/or correcting operation of computing systems generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Receiving Device Health Manager Overview

Figure 2:
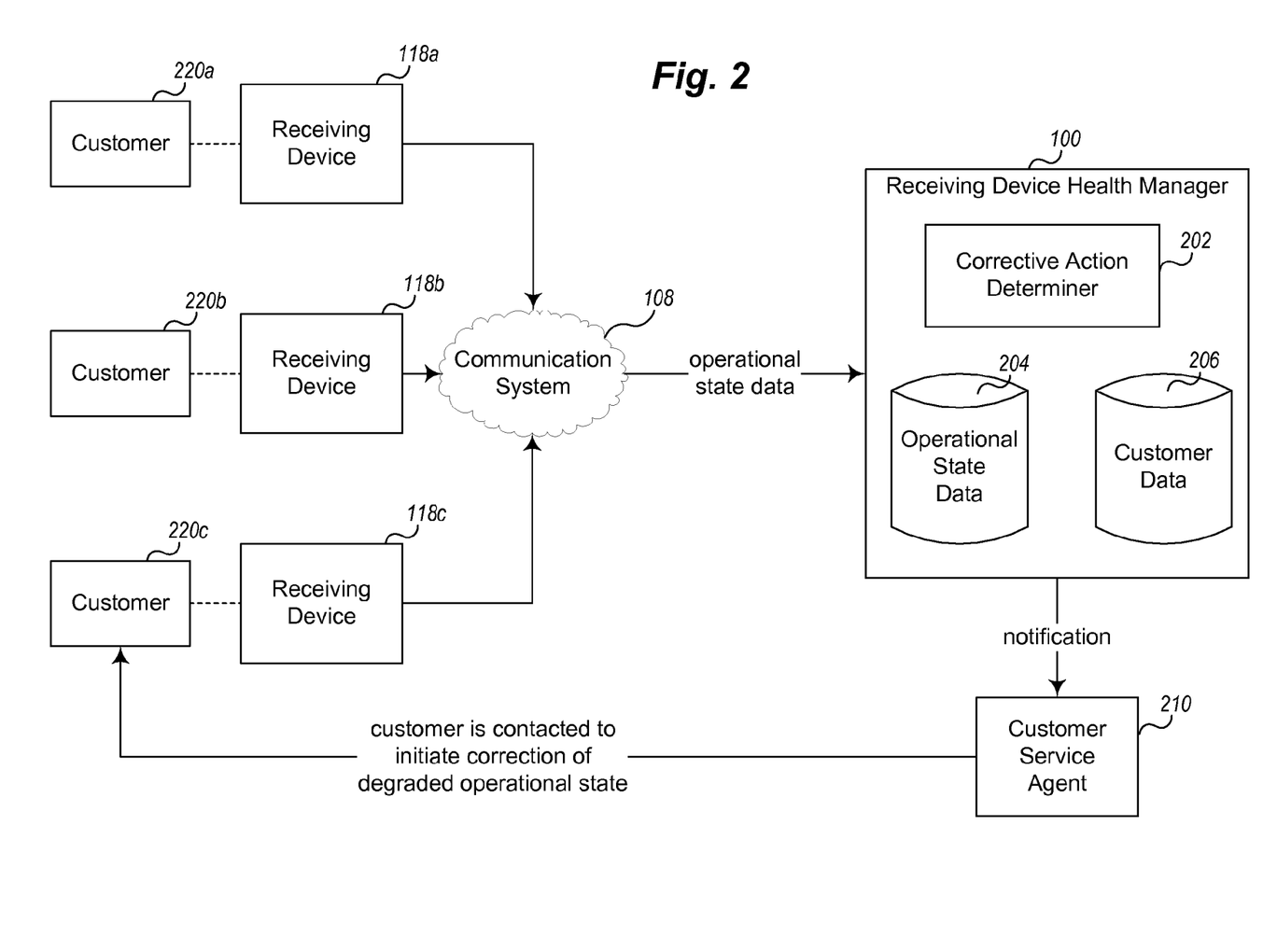
FIG. 2 is a block diagram illustrating example functional elements of an example embodiment.

FIG. 2 is a block diagram illustrating example functional elements of an example embodiment. In particular, FIG. 2 shows an example Receiving Device Health Manager ("RDHM") 100. The RDHM 100 is communicatively coupled to a plurality of receiving devices 118a-118c and a human and/or machine customer service agent 210. Each of the receiving devices 118a-118c has a respective associated customer 220a-220c. The RDHM 100 comprises a corrective action determiner 202, operational state data 204, and customer data 206. In the illustrated example, the corrective action determiner 202 may be a code module that performs the functionality of the RDHM 100. The RDHM 100 and its components may be implemented as part of a computing system, as will be further described with reference to FIG. 5, below.

In the illustrated example of FIG. 2, the RDHM 100 is configured to receive operational state data from the receiving devices 118a-118c and to store the received operational state data as operational state data 204. The operational state data may be received in various ways. For example, the receiving devices 118a-118c may be configured to transmit the operational state data to the RDHM 100 on a periodic basis, such as daily, weekly, monthly, or the like. In another embodiment, the receiving devices 118a-118c may be configured to transmit the operational state data upon the occurrence of some event, such as when a degraded operational state is experienced by one of the receiving devices 118a-118c. Various protocols for communicating the operational state data between the receiving devices 118a-118c are contemplated, including the receiving devices 118a-118c transmitting the operational state data upon receiving a request from the RDHM 100, the receiving devices 118a-118c transmitting the operational state data without initiation by the RDHM 100, and the like.

Operational state data may reflect information about the operational state, or "health," of a receiving device 118a-118c. Such information may include, for example, a measured strength of a programming signal received by each of the receiving devices 118a-118c. For example, when the receiving devices 118a-118c are configured to receive programming signals from a satellite 112 via a receiver antenna 114, the receiving devices 118a-118c may measure the strength of the received signal, such that the measured signal strength may be communicated to the RDHM 100. Other types of operational state data may include information about various hardware conditions, software conditions, connectivity conditions, operating environment information, receiving device temperature, and the like. Connectivity conditions may include information about whether or not particular types of cables, such as Ethernet, USB, and the like, are connected to a receiving device; information about various communication interfaces, such as signal strength and/or signal to noise ratios; and the like. In addition, operating environment information may include information about settings, user preferences, environment variables, and the like, that are associated with a receiving device and/or its associated devices, such as a presentation device. For example, operating environment information may include internal receiving device settings or preferences such as modulated output frequency, output resolution, audio output/format preferences, and the like; display resolution or other settings, such as volume, contrast, color adjustment, and the like, of a presentation device that is communicatively coupled to a receiving device; and the like. Receiving device temperature may include one or more temperature measurements taken in, on, or around the housing of a receiving device and/or one or more components of the receiving device, such as a central processing unit, video/graphics processor, mass storage device, and the like. Additional details regarding operational state data are provided with reference to FIG. 3, below.

The illustrated RDHM 100 is further configured to determine whether one or more of the receiving devices 118a-118c is experiencing, or has experienced, a degraded operational state. In this example, the RDHM 100 examines operational state data received from receiving devices 118a-118c and determines that receiving device 118c has measured a signal strength that is below a predetermined threshold level. When receiving device 118c measures a signal that is below the predetermined threshold level, it may mean that the antenna 114 associated with the receiving device 118c is not properly aligned with respect to the position of the satellite 112 from which the receiving device 118c is receiving its programming signal.

The illustrated RDHM 100 is further configured to determine and initiate actions to correct degraded operational states of the receiving devices 118a-118c. Various types of actions to correct degraded operational states may be initiated. In the current example, where the RDHM 100 has determined that receiving device 118c has experienced degraded signal quality, the RDHM 100 may determine to initiate a customer service contact. The RDHM 100 may initiate a customer service contact by notifying, transmitting, sending, or otherwise communicating with the customer service agent 210 a request or order to contact the customer 220c associated with receiving device 118c. The customer service agent 210 may then communicate with the customer 220c to schedule a technician visit to the customer's premises in order to adjust the antenna 114 or otherwise correct the degraded operational state.

Other types of corrective actions may be initiated by the RDHM 100, possibly based on the customer data 206 and/or the operational state data 204. For example, other mechanisms or techniques may be utilized to communicate with the customer 220c. In some cases, the customer may be contacted via email message, postal mail message, popup message displayed by the receiving device 118c, and the like. Such messages sent to the customer may request that the customer contact a customer service agent, or take other steps to correct the degraded operational state, such as perform various self-help or diagnostic operations. In other embodiments, the corrective action may include the customer service agent 210 remotely accessing (e.g., via a network) receiving device 118c, so as to diagnose and/or correct the degraded operational state, such as by executing diagnostic tests, viewing system information, installing and/or configuring software, and the like. In addition, in some embodiments the corrective action may be performed without human intervention. For example, the corrective action may be programmatically performed, such as by initiating the distribution of new software for installation on the receiving device 118c.

In at least some embodiments, the RDHM 100 will variously select, filter, and/or prioritize operations with respect to the initiation of corrective actions for the receiving devices 118a-118c. These selection, filtering, and/or prioritization operations may be based at least in part on information about the customers 220a-220c stored as customer data 206. For example, the RDHM 100 may, based on an examination of customer data 206, determine that customer 220c is on a do-not-call list, and elect either not to contact the customer 220c by telephone or instead to contact the customer utilizing some other communication mechanism, such as postal mail, electronic mail, or the like. As another example, the RDHM 100 may determine that the customer 220c has been previously contacted regarding a degraded operational state in receiving device 118c, but has refused an offer to schedule a technician visit to correct the problem. In such a circumstance, the RDHM 100 may elect to not initiate a corrective action with respect to receiving device 118c. As a third example, the RDHM 100 may determine that customer 220c is a new customer, because they have opened an account within a predetermined amount of time. In such a circumstance, the RDHM 100 may assign a higher priority to correcting problems with receiving device 118c, so as to improve new customer satisfaction. Additional approaches to selecting, filtering, and/or prioritizing corrective actions are discussed with respect to FIG. 4, below.

C. Example Operational State Data and Customer Data

Figure 3:
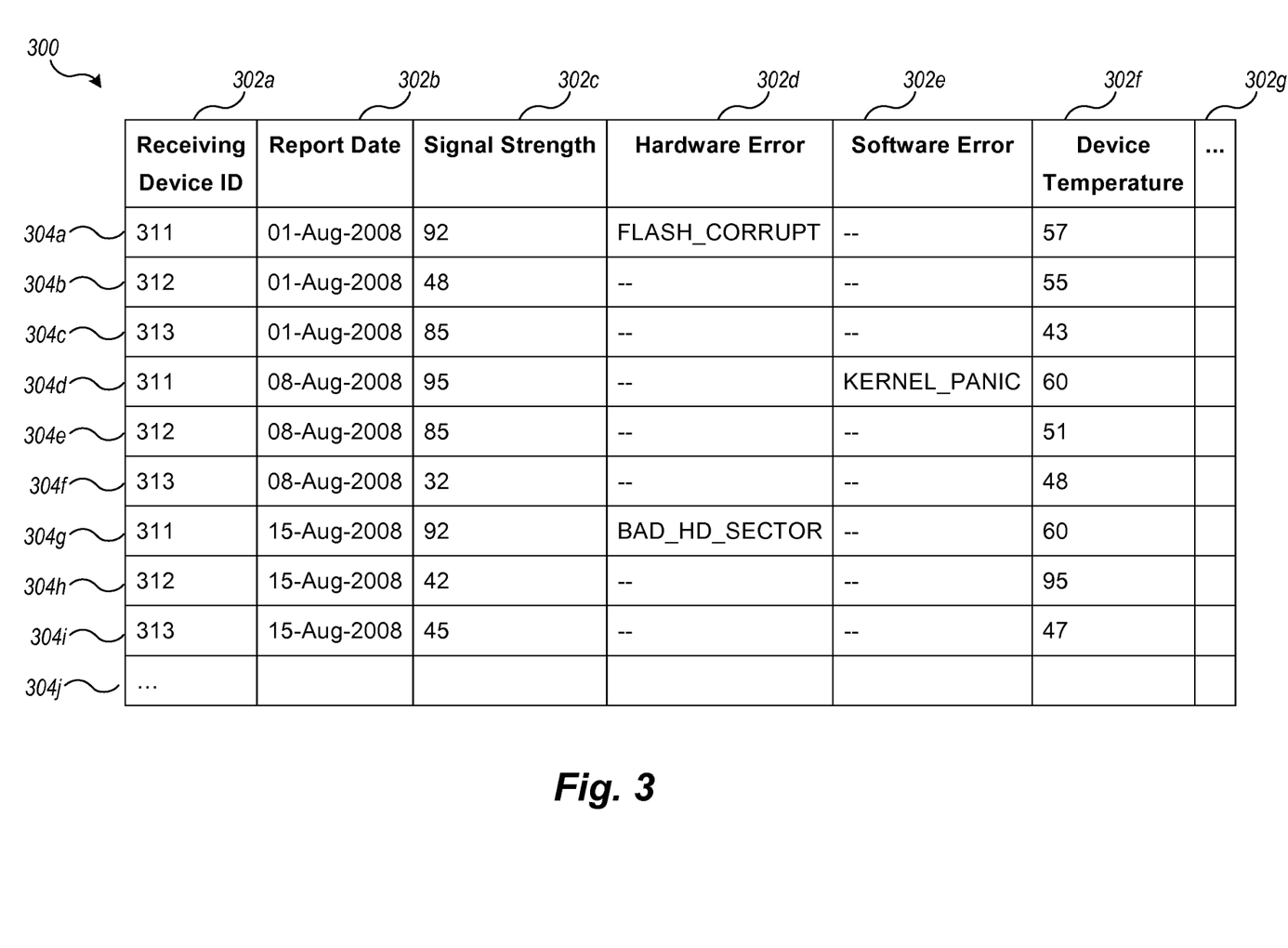
FIG. 3 is a table illustrating example operational state data utilized by an example embodiment.

FIG. 3 is a table illustrating example operational state data utilized by an example embodiment. In particular, FIG. 3 shows a table 300 having operational state data arranged in rows 304a-304j and columns 302a-302g. The information of table 300 may be stored, for example, as operational state data 204, described with reference to FIG. 2. Each row 304a-304j includes operational state data received from a single receiving device at a particular time, including receiving device identifier ("ID") 302a, report date 302b, signal strength 302c, hardware error indicator 302d, software error indicator 302e, and device temperature 302f.

The example operational state data includes information about the operational states experienced by receiving devices at particular times or during particular time intervals. In the illustrated example, every receiving device reports its operational state data on a weekly basis. Accordingly, each row 304a-304j includes a weekly report that includes operational state data accumulated during the previous week. For example, row 304a indicates that receiving device 311 provided operational state data on Aug. 1, 2008, reflecting a signal strength of 92 (on a scale from 0 to 100, for example), a hardware error ("FLASH_CORRUPT") with one of the memories of the receiving device, no software errors, and a device temperature of 57 degrees Celsius. Row 304b indicates that receiving device 312 provided operational state data on Aug. 1, 2008, reflecting a signal strength of 48, no hardware errors, no software errors, and a device temperature of 55 degrees Celsius. In all, table 300 illustrates operational state data received from three distinct receiving devices 311-313, reflecting the operation of the three receiving devices 311-313 over a three week period. Operational state data received from additional receiving devices and/or additional operational state data received from receiving devices 311-313 may be represented, as illustrated by row 304j.

Operational state data values may reflect conditions experienced by a receiving device at or over various times. In one embodiment, an operational state data value may reflect an instantaneous measurement of a particular condition, such as signal strength. For example, the signal strength 302c may be the strength of a received signal measured at or near the time when an operational state data report is provided by a particular receiving device. In other embodiments, an operational state data value may reflect a maximum, minimum, or average of multiple measurements taken at multiple distinct times. For example, the signal strength 302c may be the strength of a received signal averaged over multiple (e.g., hourly, daily, etc.) measurements made during the week or other time period prior to the time when an operational state data report is provided.

Various types of hardware and/or software conditions may also be reported by receiving devices. For example, row 304a illustrates that receiving device 311 detected that all or a portion of its flash memory was corrupt, row 304d illustrates that receiving device 311 detected an operating system kernel panic, and row 304g illustrates that receiving device 311 detected a bad hard disk sector. Other types of hardware and software conditions that may be reported include storage system faults, input/output system faults, power outages, battery failure, software exceptions, and the like.

As noted, the RDHM 100 may utilize operational state data to determine whether a particular receiving device is or has experienced a degraded operational state. For example, the RDHM 100 may determine that a receiving device is experiencing degraded signal strength if its two most recent signal strength measurements are below 50. Thus, if the RDHM 100 is operating on Aug. 16, 2008, it will determine that only receiving device 313 is experiencing degraded signal strength, based on measurements of 32 and 45, illustrated in rows 304*f* and 304*i*, respectively. As another example, the RDHM 100 may determine that a receiving device is experiencing degraded signal strength if at least two of the three most recent signal strength measurements are below 50. In this case, if the RDHM 100 is operating on Aug. 16, 2008, it will determine that receiving devices 312 and 313 are experiencing degraded signal strength, based on measurements of 48 and 42 for receiving device 312, illustrated in rows 304*b* and 304*h* respectively, and measurements of 32 and 45 for receiving device 313, illustrated in rows 304*f* and 304*i* respectively.

In other embodiments, the RDHM 100 may utilize operational state data from a greater or lesser number of operational state data reports to determine whether a particular receiving device is experiencing a degraded operational state. For example, the RDHM 100 may determine that a receiving device is experiencing degraded signal strength if its four most recent signal strength measurements are below a particular threshold. In another embodiment, the RDHM 100 may determine that a receiving device is experiencing a degraded operational state based on as little as a single operational state data report. For example, the RDHM 100 may determine that a particular receiving device is no longer capable of recording programs based on a single report of a fatal disk condition, such as a hard disk read/write head crash.

In other embodiments, more or less information may be utilized, as indicated by column 302*g* and row 304*j*. For example, some embodiments may provide minimum, maximum, and average values for particular operational states, such as signal strength or temperature. Other embodiments may divide hardware errors into multiple columns, such as by including volatile memory faults, persistent storage faults, input/output faults, and the like. Furthermore, operational state data may be represented using other units and/or scales than the ones illustrated. For example, signal strength 302*c* may be normalized to a different scale, such as a floating point value between 0 and 1, or device temperature 302*f* may be represented in degrees Fahrenheit or Kelvin rather than Celsius. In some embodiments, operational state data may contain less information than illustrated in FIG. 3. For example, operational state data may be a single indication that a given receiving device is experiencing a degraded operational state.

Also, other embodiments may receive operational state data reports at different times, or may receive operational state data reports that reflect different time periods. For example, operational state data reports may be provided more frequently, such as on a daily basis. In other embodiments, operational state data reports may be provided upon or in response to the occurrence of particular events or conditions. For example, a receiving device may provide an operational state data report when signal strength 302*c* is measured to be below a particular threshold, or when device temperature 302*f* is measured to be above a particular threshold.

The RDHM 100 may utilize various distinct standards or thresholds for determining whether a degraded operational state exists. In some embodiments, such standards may be based at least in part on information about customers associated with that particular receiving device, such as whether the customer is a new customer, whether the customer is a high-volume subscriber, whether the customer is technically sophisticated, and the like. This and other customer criteria data is useful to select which customers should receive service calls, or the priority of providing service to customers. For example, the RDHM 100 may determine that a degraded operational state exists in a receiving device associated with a customer who entered into a first-time service contract less than a month ago, based on a smaller number of operational state data reports (e.g., a single low signal strength measurement) than would lead the RDHM 100 to determine a degraded operational state with respect to established customers. With such a strategy, new customers will typically receive corrective action more quickly than established customers, possibly resulting in increased new customer satisfaction.

Figure 4:
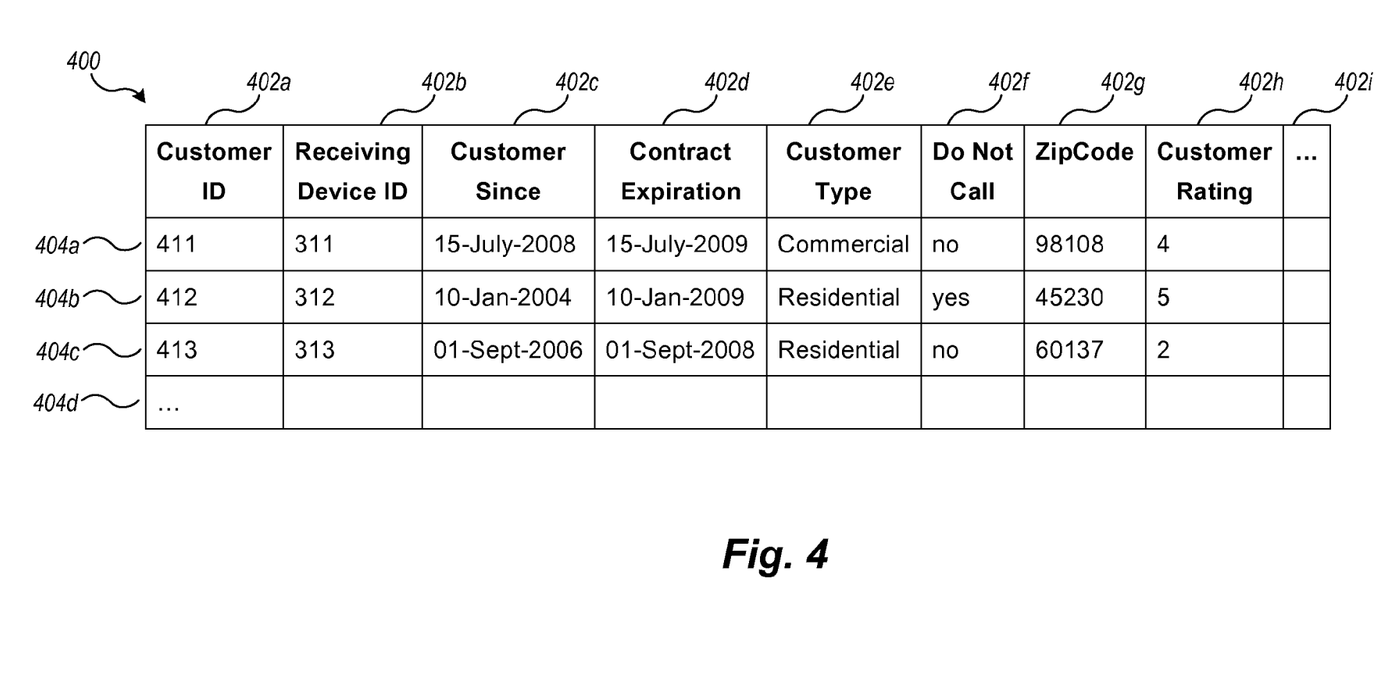
FIG. 4 is a table illustrating example customer data utilized by an example embodiment.

FIG. 4 is a table illustrating example customer data utilized by an example embodiment. In particular, FIG. 4 shows a table 400 having customer data arranged in rows 404*a*-404*d* and columns 402*a*-402*i*. Customer data such as is illustrated in table 400 may be used by the RDHM 100, in conjunction with operational state data such as is illustrated in table 300, to make various decisions about the timing and/or type of corrective actions to initiate. The information of table 400 may be stored, for example, as customer data 206, described with reference to FIG. 2.

Each row 404*a*-404*d* includes data about a single customer and/or customer account, including customer identifier ("ID") 402*a*, receiving device identifier ("ID") 402*b*, customer since date 402*c*, contract expiration date 402*d*, customer type 402*e* (e.g., whether the customer is a commercial customer, residential customer, or some other customer classification), do not call indicator 402*f*, customer zip code 402*g*, and customer rating 402*h*. As an example, row 404*a* indicates that customer 411 is associated with receiving device 311, has been a customer since Jul. 15, 2008, has entered into a contract that expires Jul. 15, 2009, is a commercial customer, is not on a do-not-call list, is located in zip code 98108, and has a customer rating of 4 out of a possible 5 points. In all, the table 400 shows customer data related to three customers 411-413 illustrated in rows 404*a*-404*c*, respectively. Customer data related to additional customers may be represented, as shown by row 404*d*.

As noted, the RDHM 100 may utilize information about customers when making decisions about whether and when to initiate corrective action and/or what types of corrective action to initiate. In general, given multiple receiving devices that are experiencing degraded operational states, the RDHM 100 may select or filter, based on various selection criteria, some subset of the receiving devices for corrective action based on various factors. For example, assuming that the RDHM 100 has determined that each of the three receiving devices 311, 312, and 313 described with respect to table 300, are experiencing a degraded operational state, the RDHM 100 may elect to initiate corrective action with respect to all, some, or even none of receiving devices. For instance, the RDHM 100 may elect not to initiate a corrective action with respect to customer 411 (shown in row 404*a*), who is associated with receiving device 311, for various reasons, such as because that customer is a commercial customer, or because that customer resides in a zip code where service technicians are currently overloaded or otherwise unavailable. Alternatively, assuming for example that the RDHM 100 is operating on Aug. 16, 2008, the RDHM 100 may instead elect to initiate corrective action with respect to customer 411, because that customer is relatively new, in that they started utilizing the service less than two months ago (on Jul. 15, 2008). As another example, the RDHM 100 may elect not to initiate a corrective action consisting of a telephone call with respect to customer 412 (shown in row 404b), because that customer is on a do-not-call list, as illustrated by column 402f.

Furthermore, given multiple receiving devices that are experiencing degraded operational states, the RDHM may prioritize corrective actions based on various factors. For example, assuming that receiving devices 312 and 313 described with respect to table 300 and respectively associated with customers 412 and 413, are experiencing a degraded operational state, the RDHM 100 may elect to prioritize corrective actions taken with respect to those receiving devices based on customer criteria data. As one example, the RDHM 100 may make corrective actions with respect to receiving device 312 a higher priority than those taken with respect to receiving device 313, because customer 412 associated with receiving device 312 has a high customer rating 402h (5 out of a possible 5), making that customer a preferred customer. Examples of preferred customers include those that pay their bills in a timely manner, subscribe to relatively expensive programming packages, subscribe to a large quantity of pay-per-view programming, and the like. As another example, assuming that the RDHM 100 is operating on Aug. 16, 2008, the RDHM 100 may make corrective actions with respect to receiving device 313 a higher priority, because customer 413 associated with receiving device 313 has a contract that will expire within a month (on Sep. 1, 2008).

Other embodiments may prioritize corrective actions based on other customer criteria data and factors and/or in other ways. For example, RDHM 100 may prioritize corrective actions based on the volume, timing, and/or type of programming viewed and/or subscribed by a particular customer. For example, supposing that a receiving device associated with a customer who subscribes to a sports package that broadcasts the majority of its games on Sunday, such as a National Football League programming package, is experiencing a degraded operational state on a Tuesday, the RDHM 100 may determine to provide the customer with high priority service, such that the degraded operational state is corrected prior to the following Sunday. As another example, a receiving device associated with a customer who orders large quantities of pay-per-view programming, or otherwise pays relatively more than other customers, may be provided with higher priority service than those other customers.

In other embodiments, more or less information may be utilized, as indicated by column 402i and row 404d. In particular, a wide variety of information and other factors may be considered by the RDHM 100 when making decisions about the timing and type of corrective actions. As noted, the RDHM 100 may utilize information about customers associated with receiving devices, including geographic location of the customer, account or service contract start and/or expiration dates, language spoken by the customer, customer status (e.g., whether the customer is a preferred customer), customer payment history, customer viewing habits, whether the customer account has a recently opened and/or closed work order, whether the customer has recently initiated a customer service contact, whether the customer is on a do-not-call list, whether the customer has been contacted previously regarding the operational state of an associated receiving device, and the like.

In some embodiments, the RDHM 100 may also, or instead, use information about the receiving devices themselves. For example, the RDHM may give priority to customers who utilize particular types of receiving devices, such as those with high-definition capabilities, recording capabilities, and the like. In some cases, priority of corrective actions may be determined at least in part based on a measure of the severity of the degraded operational state of a receiving device. For example, receiving devices receiving no signal may be given higher priority than those receiving at least some signal. In some cases, multiple operational state data items may be aggregated to determine an overall "health rating" for a given receiving device, such that this health rating can be utilized to appropriately prioritize service for the receiving device.

D. Example Computing System Implementation

Figure 5:
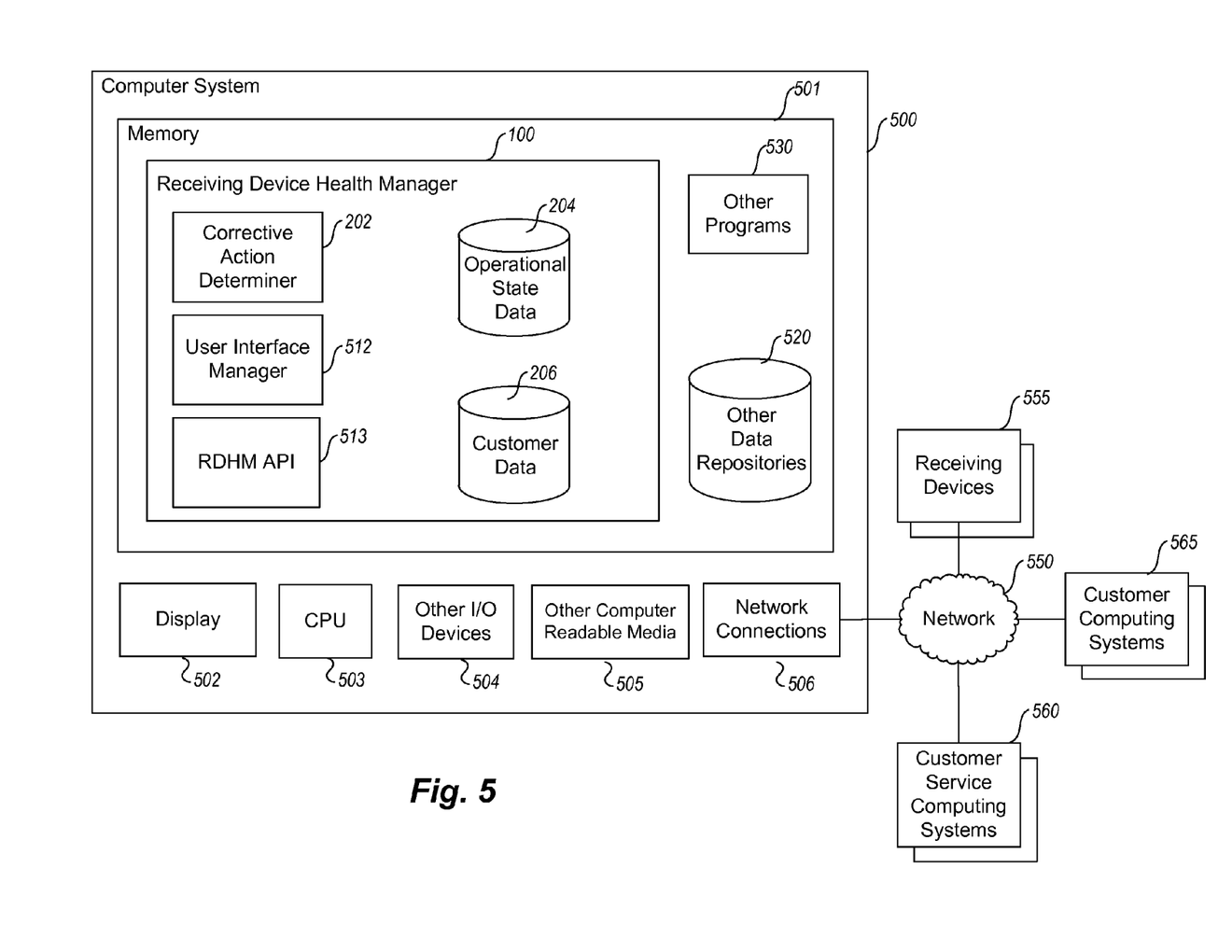
FIG. 5 is an example block diagram of a computing system for practicing example embodiments of a receiving device health manager.

FIG. 5 is an example block diagram of a computing system for practicing embodiments of a receiving device health manager. FIG. 5 shows a computing system 500 that may be utilized to implement a Receiving Device Health Manager ("RDHM") 100. Note that one or more general purpose or special purpose computing systems/devices may be used to implement the RDHM 100. More specifically, the computing system 500 may comprise one or more distinct computing systems/devices and may span distributed locations. In addition, each block shown may represent one or more such blocks as appropriate to a specific embodiment or may be combined with other blocks. Moreover, the various blocks of the RDHM 100 may physically reside on one or more machines, which use standard (e.g., TCP/IP) or proprietary inter-process communication mechanisms to communicate with each other. Further, the RDHM 100 may be implemented in software, hardware, firmware, or in some combination to achieve the capabilities described herein.

In the embodiment shown, computing system 500 comprises a computer memory ("memory") 501, a display 502, one or more Central Processing Units ("CPU") 503, Input/Output devices 504 (e.g., keyboard, mouse, CRT or LCD display, and the like), other computer-readable media 505, and network connections 506. The RDHM 100 is shown residing in memory 501. In other embodiments, some portion of the contents, some of, or all of the components of the RDHM 100 may be stored on and/or transmitted over the other computer-readable media 505. The components of the RDHM 100 preferably execute on one or more CPUs 503 and receiving device health, as described herein. Other code or programs 530 (e.g., a Web server, a database management system, and the like) and potentially other data repositories, such as data repository 520, also reside in the memory 510, and preferably execute on one or more CPUs 503. Of note, one or more of the components in FIG. 5 may not be present in any specific implementation. For example, some embodiments embedded in other software many not provide means for user input or display.

In a typical embodiment, the RDHM 100 includes a corrective action determiner 202, user interface manager 512, a receiving device health manager application program interface ("RDHM API") 513, an operational state data repository 204, and a customer data repository 206. Other and/or different modules may be implemented. In addition, the RDHM 100 may interact via a network 550 with one or more receiving devices 555, customer computing systems 565, and customer service computing systems 560.

The corrective action determiner 202 performs the core functions of the RDHM 100, as discussed with respect to FIGS. 2-4, above. In particular, the corrective action determiner 202 receives operational state data, either directly from receiving devices 555 or via the operational state data repository 204. In addition, the corrective action determiner 202 determines, based on operational state data and/or customer data, whether to initiate corrective action with respect to various receiving devices. Furthermore, the corrective action determiner 202 determines, based on operational state data and/or customer data, the timing and type of corrective actions to perform.

The user interface engine 512 provides a view and a controller that facilitate user interaction with the RDHM 100 and its various components. For example, the user interface engine 512 may, for example, provide an interactive graphical user interface that may be used by an administrative user to generate reports of customer accounts associated with receiving devices experiencing degraded operational states. These reports may be forwarded, for example, to the customer service computing systems 560, such that customer service agents may contact customers indicated therein. In other embodiments, the user interface engine 512 may be accessed directly by customer service agents and/or other users, such that those users can obtain indications of customers and associated receiving devices that are experiencing degraded operational states. In at least some embodiments, access to the functionality of the user interface engine 512 may provided via a Web server, possibly executing as one of the other programs 530.

The RDHM API 513 provides programmatic access to one or more functions of the RDHM 100. For example, the RDHM API 513 may provide a programmatic interface to one or more receiving device health management functions of the RDHM 100 that may be invoked by one of the other programs 530 or some other module. In this manner, the RDHM API 513 may facilitate the development of third-party software, such as user interfaces, plug-ins, adapters (e.g., for integrating functions of the RDHM 100 into desktop applications), and the like. In addition, the RDHM API 513 may be in at least some embodiments invoked or otherwise accessed via remote entities, such as the customer service computing systems 560, to access various receiving device health management functionality of the RDHM 100.

The operational state data repository 204 records information related to the operational state of the receiving devices 555. Such information may include indications of signal strength, hardware faults, software faults, device temperature, and the like. Additional examples of operational state data are provided with reference to FIG. 3, above. In some embodiments, the corrective action determiner 202 is configured to receive operational state data from the receiving devices 555 and record the received operational state data in the data repository 204. In other embodiments, some other module, such as one of the other programs 530, is configured to receive and record operational state data in the data repository 204. In some cases, the operational state data is processed after being received from the receiving devices 555 and prior to its use by the RDHM 100. Such processing may include data cleaning, format modification, data normalization, unit conversion, and the like. The operational state data may be communicated via network 550 in various ways. For example, some receiving devices 555 may be connected, for example via an Ethernet connection, to a home network that is in turn connected to network 550. Other receiving devices 555 may include a modem or other device with which they can establish a telephonic connection with the network 550. Still other receiving devices 555 may utilize a cable or fiber-optic back channel or upstream channel to provide two way communications with the network 550.

The customer data repository 206 records information related to customers associated with receiving device 555. Such information may include contact information/preferences, receiving device information, customer service contract information, and the like. Additional examples of customer data are provided with reference to FIG. 4, above. The customer data may be obtained from various sources, such as from one of the other data repositories 520 and/or a customer relationship management system operated by, for example, one of the customer service computing systems 560.

In an example embodiment, components/modules of the RDHM 100 are implemented using standard programming techniques. For example, the RDHM 100 may be implemented as a "native" executable running on the CPU 503, along with one or more static or dynamic libraries. In other embodiments, the RDHM 100 may be implemented as instructions processed by virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an RDHM implementation. Also, other functions could be implemented and/or performed by each component/module, and in different orders, and by different components/modules, yet still achieve the functions of the RDHM.

In addition, programming interfaces to the data stored as part of the RDHM 100, such as in the operational state data repository 204 and/or the customer data repository 206, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 204 and 206 may be implemented as one or more database systems, file systems, or any other technique for storing such information, or any combination of the above, including implementations using distributed computing techniques.

Also the example RDHM 100 may be implemented in a distributed environment comprising multiple, even heterogeneous, computer systems and networks. For example, in one embodiment, the corrective action determiner 202, the user interface engine 512, the RDHM API 513, and the data repositories 204 and 206 are all located in physically different computer systems. In another embodiment, various modules of the RDHM 100 are hosted each on a separate server machine and may be remotely located from the tables which are stored in the data repositories 204 and 206. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an RDHM.

Furthermore, in some embodiments, some or all of the components of the RDHM may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

Figure 6:
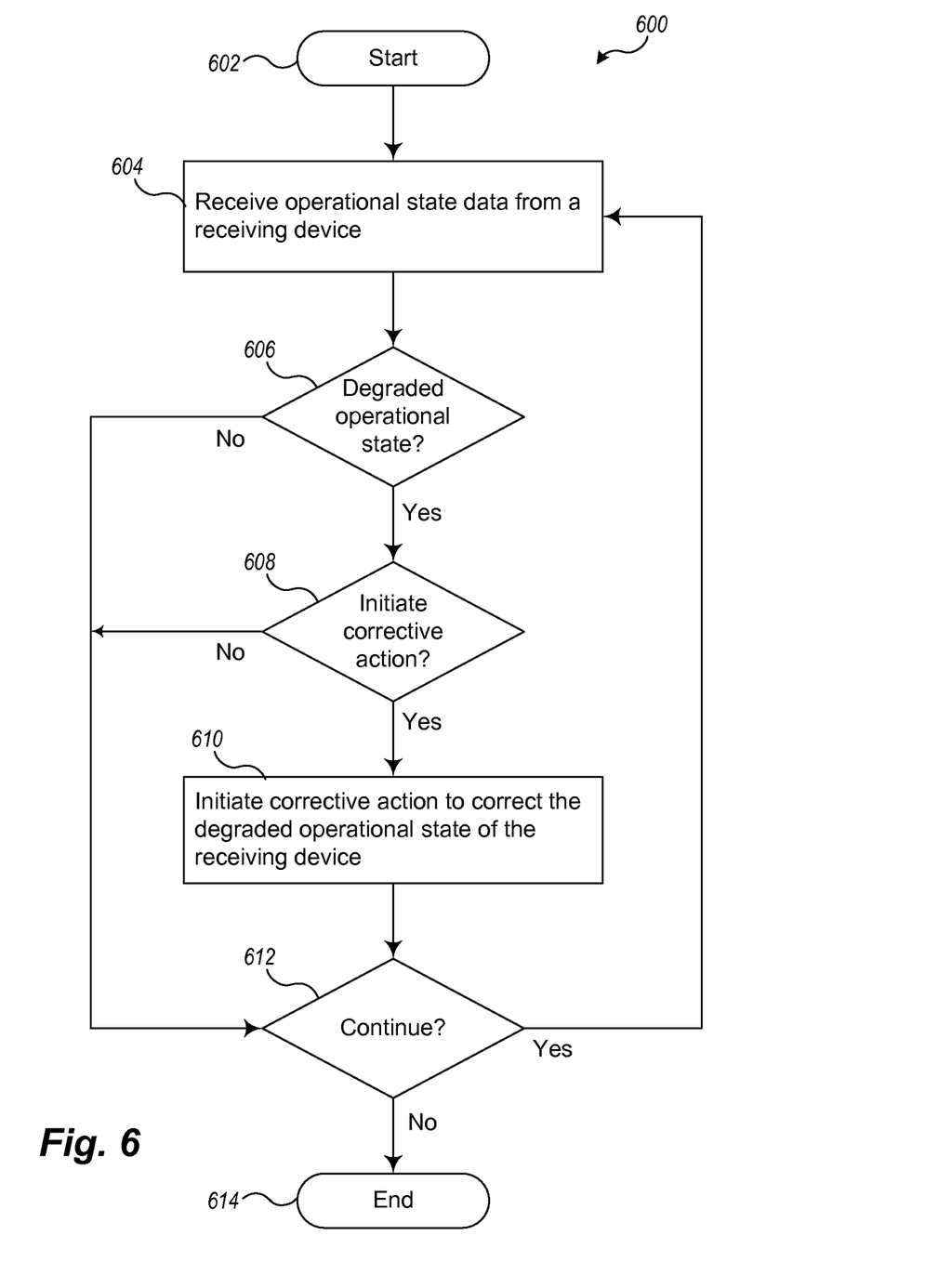
FIG. 6 is a flow diagram of an example receiving device health manager process provided by an example embodiment.

FIG. 6 includes a flow diagram of process 600. In this regard, the described process may represent a module, segment, or portion of code, which comprises one or more executable instructions for implementing the specified logical function(s). It should also be noted that in some implementations, the functions described in the process may occur in a different order, may include additional functions, may occur concurrently, and/or may be omitted.

In particular, FIG. 6 is a flow diagram of an example receiving device health manager process 600 provided by an example embodiment. The process 600 may be implemented by, for example, one or more modules/components of the RDHM 100, such as the corrective action determiner 202 described with respect to FIGS. 2 and 5.

The process 600 starts at 602. At 604, the process receives operational state data from a receiving device. The process may receive the operational state data from a data repository, such as the operational state data repository 204. In other embodiments, the process may receive the operational state data directly from the receiving device, such as via a network connection or other communication mechanism. Various examples of operational state data are provided with respect to FIG. 3, above.

At 606, the process determines, based at least in part on the received operational state data, whether the receiving device is experiencing or has experienced a degraded operational state, and if so, proceeds to 608, else to 612. As discussed, various aspects of the operational state data may be utilized to make this determination, including programming signal strength measured by the receiving device, temperature of the receiving device, software and/or hardware faults experienced by the receiving device, and the like. In one embodiment, the process determines that the receiving device has experienced a degraded operational state when the receiving device has reported, at weekly intervals, four consecutive signal strengths that are below a predetermined level. In some embodiments, determining whether a receiving device is in a degraded operational state may also be based on other information, such as information about a customer associated with the receiving device. Various other examples of determining whether a receiving device is experiencing a degraded operational state are provided with respect to FIG. 3, above.

At 608, the process determines whether to initiate corrective action, and if so, proceed to 610, else to 612. This determination may be based on information about a customer associated with the receiving device and/or the receiving device itself, such as information stored as customer data 206. For example, in one embodiment, customers who are on a do-not-call list, commercial customers, customers with inactive (e.g., paused or suspended accounts), customers with open work orders, customers in particular geographic regions (e.g., those with overloaded service technicians), and the like will not be contacted. Various other examples of determining whether to initiate corrective action are discussed with reference to FIG. 4, above.

At 610, the process initiates a corrective action to correct the degraded operational state of the receiving device. Various types of corrective actions may be initiated, possibly based on information about a customer associated with the receiving device and/or the receiving device itself, such as information stored as customer data 206. In one embodiment, an indication of the customer associated with the receiving device is provided to a customer service agent, such that the customer service agent may telephonically contact the customer in order to schedule a service call to correct a low signal strength condition. In another embodiment, if the customer is on a do-not-call list or if multiple attempts have been made to telephone the customer, the customer may instead by contacted via email, postal mail, popup message dispatched to the receiving device, or the like. In addition, the process may here prioritize and/or order the corrective action, such that a corrective action taken with respect to this receiving device is taken before/after a corrective action taken with respect to another receiving device.

At 612, the process determines whether to continue, and if so, proceeds to 604, else to 614, where it ends. The process may continue if, for example, there exists additional operational state data from further receiving devices to process.

While the process 600 is described as operating on a per-receiving device basis, it may be structured in other ways. For example, the process 600 may operate in a batch manner, in which it processes information about multiple receiving devices and/or customers in a single operation and/or step. In addition, instead of utilizing a receiving device as its unit of operation, the process 600 may instead utilize a customer account, customer type, geographic region, receiving device type, or other abstraction as its unit of operation.

Some embodiments may exclude or optionally perform one or more aspects/operations of process 600. For example, some embodiments may not determine whether to initiate a corrective action as described at block 608, such that the process 600 will initiate a corrective action for every receiving device that is determined to be in a degraded operational state.

While various embodiments have been described hereinabove, it is to be appreciated that various changes in form and detail may be made without departing from the spirit and scope of the invention(s) presently or hereafter claimed.

The invention claimed is:

1. A computing system comprising:
   a computer processor; and
   a non-transitory computer-readable storage medium coupled to the computer processor, the non-transitory computer-readable storage medium having computer-executable instructions stored thereon, that, when executed by the computer processor, cause the computer processor to:
      receive operational health data from each of a plurality of set-top boxes, each of the plurality of set-top boxes having a corresponding customer and being configured to receive video programming from a satellite network;
      select a customer from the plurality of customers, based at least in part on both the received operational health data from the set-top box that corresponds to the customer reflecting a degraded operational state of the set-top box and on the customer criteria data, wherein both the received operational health data from the set-top box and the customer criteria data are considered in order to select the customer; and
      initiate a customer service contact request with the customer to correct the degraded operational state of the set-top box that corresponds to the customer.

2. The computing system of claim 1 wherein the computer-executable instructions, when executed by the computer processor, further cause the computer processor, to:
   select the customer based at least in part on the received operational state data from the set-top box that corresponds to the customer indicating that the set-top box has received a programming signal from the satellite network that is below a predetermined threshold in strength.

3. The computing system of claim 1 wherein the computer-executable instructions, when executed by the computer processor, further cause the computer processor to:
   select the customer based at least in part on the customer meeting one or more selection criteria.

4. The computing system of claim 3 wherein the one or more selection criteria include at least one of: the customer type being residential or commercial, the customer having established service within a predetermined amount of time, the customer having a service contract that will expire within a predetermined amount time, the customer speaking a predetermined language, the customer living in a predetermined geographic region, the customer being associated with a work order that was opened or closed within a predetermined amount of time, the customer not being on a do not call list, the customer having initiated a customer service contact within a predetermined amount of time, and the customer being a preferred customer.

5. The computing system of claim 1 wherein the plurality of set-top boxes are each located remotely from the computing system and are each configured to transmit operational state data to the computing system.

6. A computer-implemented method comprising:
   receiving operational state data from each of a plurality of receiving devices, wherein each of the plurality of receiving devices has a corresponding customer and is configured to receive video programming, the receiving operational state data being performed by a configured computer system;
   identifying a customer from the plurality of customers, based at least in part on both the received operational state data from the receiving device that corresponds to the customer reflecting a degraded operational state of the receiving device and on customer criteria data, wherein both the received operational health data from the receiving device and the customer criteria data are considered in order to identify the customer, the identifying a customer from the plurality of customers being performed by the configured computer system; and
   initiating an action with respect to the customer to correct the degraded operational state of the receiving device that corresponds to the customer, the initiating an action with respect to the customer being performed by the configured computer system.

7. The method of claim 6 wherein identifying the customer is based at least in part on the received operational state data from the receiving device that corresponds to the customer indicating that the receiving device has received a programming signal that is below a predetermined threshold in strength.

8. The method of claim 6 wherein the received operational state data includes multiple operational state indicators, the operational state indicators including at least measured strength of one or more programming signals received by the receiving device, temperature of the receiving device, software errors experienced by the receiving device, and hardware faults experienced by the receiving device.

9. The method of claim 6 wherein initiating the action with respect to the customer to correct the degraded operational state of the receiving device includes initiating a telephonic communication with the customer.

10. The method of claim 6 wherein initiating the action with respect to the customer to correct the degraded operational state of the receiving device includes initiating transmission of a message to be displayed by the receiving device, the message requesting that the customer contact a customer service representative.

11. The method of claim 6 wherein initiating the action with respect to the customer to correct the degraded operational state of the receiving device includes initiating transmission of an e-mail message to the customer and/or initiating dispatch of a postal mail message the customer.

12. The method of claim 6, further comprising:
   identifying a second customer from the plurality of customers, based at least in part on the received operational state data from the receiving device that corresponds to the second customer reflecting a degraded operational state of the receiving device, the identifying a second customer being performed by the configured computer system; and
   initiating, based on one or more ordering criteria, an action with respect to the second customer to correct the degraded operational state of the receiving device that corresponds to the second customer prior to the initiating of the action with respect to the customer, the initiating an action with respect to the second customer being performed by the configured computer system.

13. The method of claim 12 wherein the one or more ordering criteria include at least one of: the second customer having a service contract that will expire within a predetermined amount of time, the second customer having established service within a predetermined amount of time, the receiving device that corresponds to the second customer having a worse operational state than the receiving device that corresponds to the customer, and the second customer being a preferred customer.

14. A non-transitory computer-readable medium comprising contents to enable a computing system to facilitate receiving device health management, by performing a method comprising:

determining, based on operational state data received from a remote receiving device that is configured to receive video programming, that the receiving device has a degraded operational state;

select a customer for which to initiate an action to correct the degraded operational state of the receiving device from a plurality of customers, the selection of the customer based at least in part on both the received operational state data from the receiving device and on customer criteria data, wherein both the received operational health data from the receiving device and the customer criteria data are considered in order to select the customer; and initiating the action to correct the degraded operational state of the receiving device.

15. The non-transitory computer-readable medium of claim 14 wherein initiating the action to correct the degraded operational state includes initiating a customer service contact with a customer associated with the receiving device.

16. The non-transitory computer-readable medium of claim 14 wherein the method further comprises:

receiving the operational state data from the receiving device, the operational state data including multiple indications of the operational state of the receiving device.

17. The non-transitory computer-readable medium of claim 14 wherein the degraded operational state is at least one of: poor received signal strength, a receiving device software error condition, and a receiving device hardware fault.

18. The non-transitory computer-readable medium of claim 14 wherein the method is performed multiple times to determine multiple receiving devices each having a degraded operational state, and wherein the method further comprises:

initiating corrective action with respect to the multiple receiving devices by producing a customer contact list that includes indications of customers associated with the multiple receiving devices.

19. The non-transitory computer-readable medium of claim 14 wherein the computer-readable medium is at least one of a memory in a computing device or a data transmission medium transmitting a generated signal containing the contents.

20. The non-transitory computer-readable medium of claim 14 wherein the contents are instructions that when executed cause the computing system to perform the method.

21. A computing system comprising:

a computer processor; and a non-transitory computer-readable storage medium coupled to the computer processor, the non-transitory computer-readable storage medium having computer-executable instructions stored thereon, that, when executed by the computer processor, cause the computer processor to:

receive operational state data from each of a plurality of receiving devices, wherein each of the plurality of receiving devices has a corresponding customer and is configured to receive video programming;

identify a customer from the plurality of customers, based at least in part on both the received operational state data from the receiving device that corresponds to the customer reflecting a degraded operational state of the receiving device and on customer criteria data, wherein both the received operational health data from the 1 receiving device and the customer criteria data are considered in order to identify the customer; and initiate an action with respect to the customer to correct the degraded operational state of the receiving device that corresponds to the customer.

22. The system of claim 21 wherein identifying the customer is based at least in part on the received operational state data from the receiving device that corresponds to the customer indicating that the receiving device has received a programming signal that is below a predetermined threshold in strength.

23. The system of claim 21 wherein the received operational state data includes multiple operational state indicators, the operational state indicators including at least measured strength of one or more programming signals received by the receiving device, temperature of the receiving device, software errors experienced by the receiving device, and hardware faults experienced by the receiving device.

24. The system of claim 21 wherein initiating the action with respect to the customer to correct the degraded operational state of the receiving device includes initiating a telephonic communication with the customer.

25. The method of claim 21 wherein initiating the action with respect to the customer to correct the degraded operational state of the receiving device includes initiating transmission of a message to be displayed by the receiving device, the message requesting that the customer contact a customer service representative.

* * * * *